E. J. BELL.
MACHINE FOR BUILDING UP BOARDS.
APPLICATION FILED APR. 13, 1911.
1,090,903.
Patented Mar. 24, 1914.
6 SHEETS—SHEET 1.
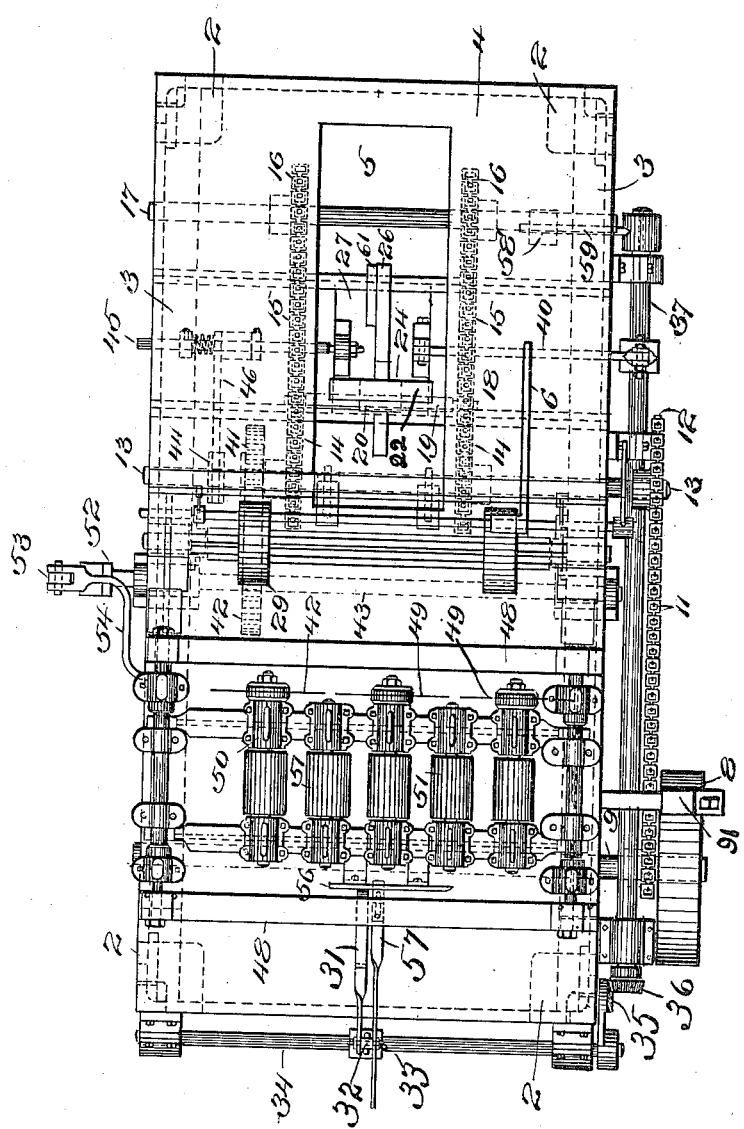

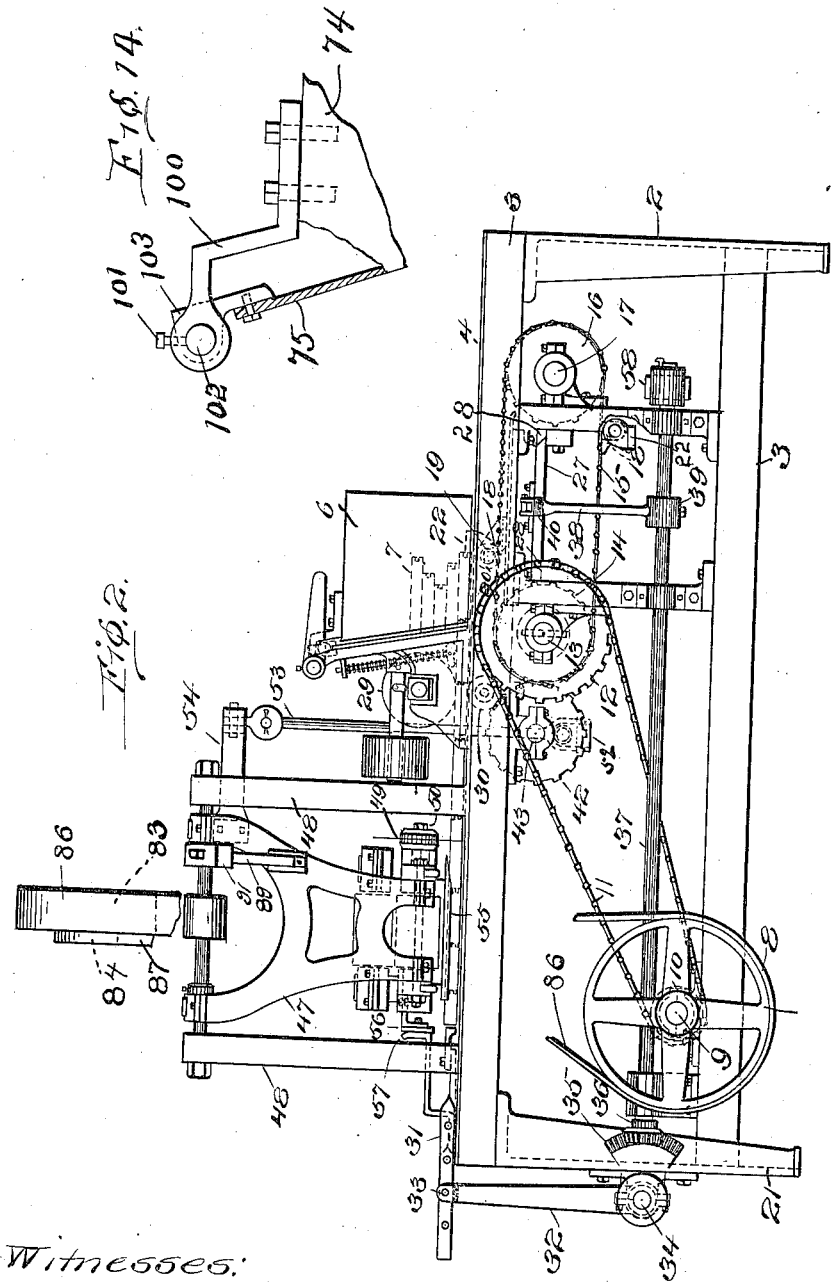

E. J. BELL.
MACHINE FOR BUILDING UP BOARDS.
APPLICATION FILED APR. 13, 1911.
1,090,903.
Patented Mar. 24, 1914.
6 SHEETS—SHEET 3.
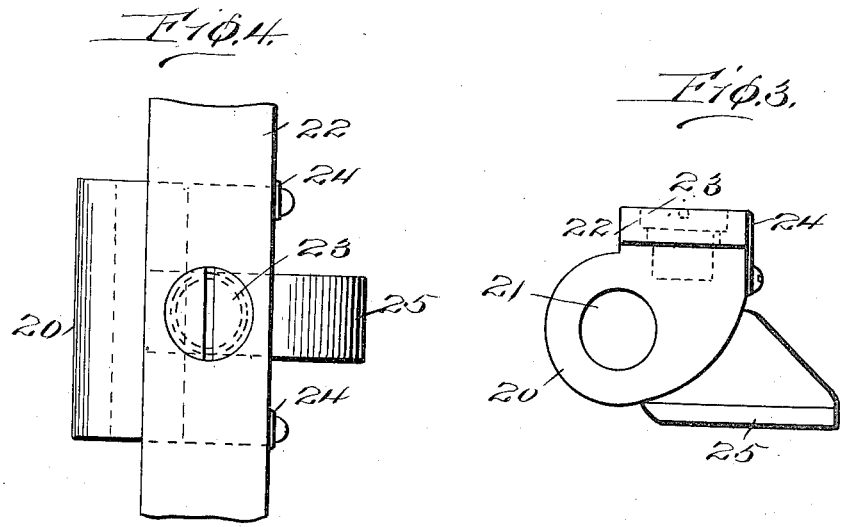
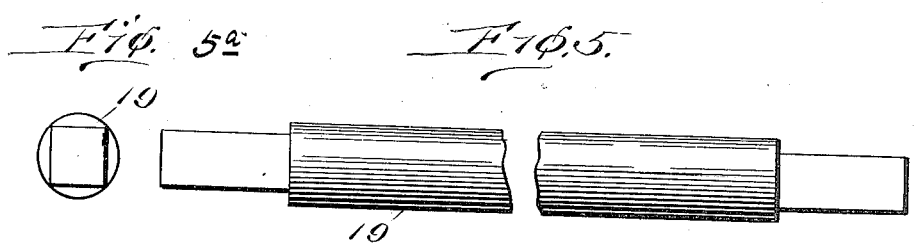
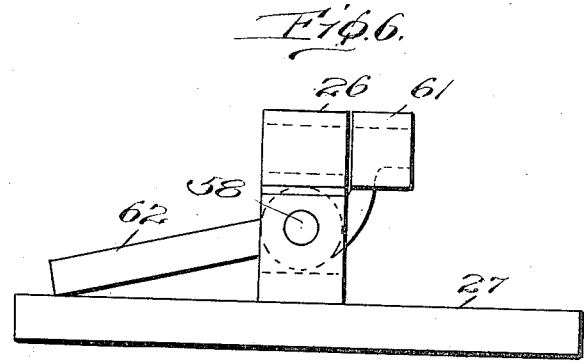

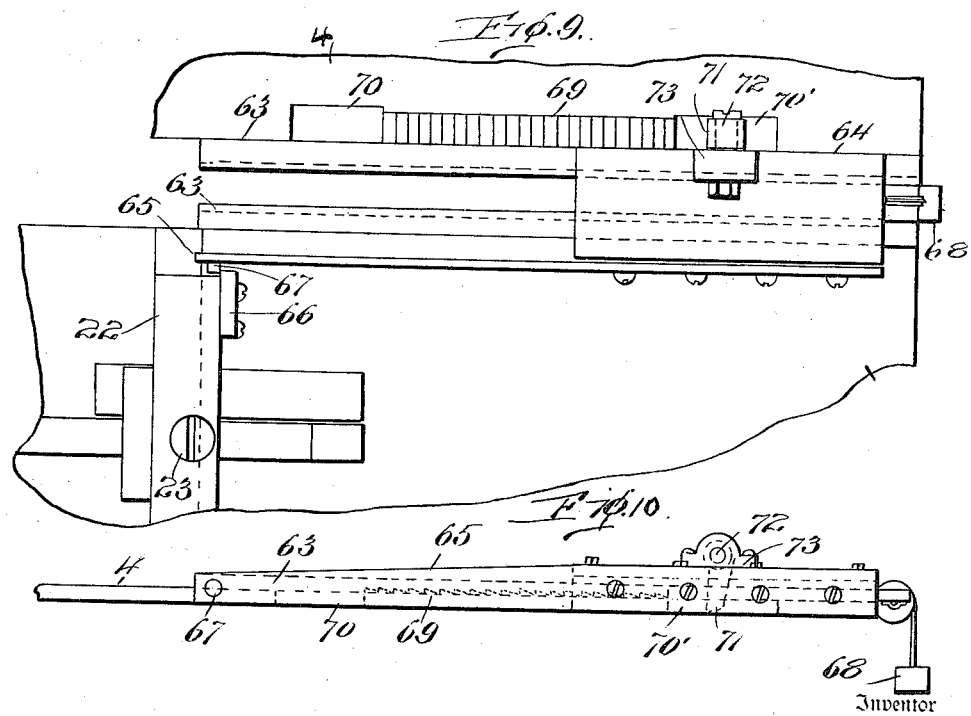

E. J. BELL.
MACHINE FOR BUILDING UP BOARDS.
APPLICATION FILED APR. 13, 1911.
1,090,903.
Patented Mar. 24, 1914.
6 SHEETS—SHEET 5.
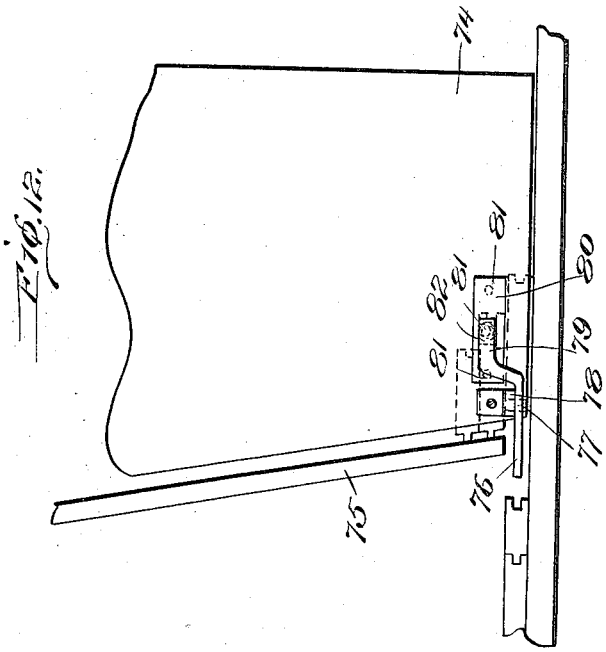
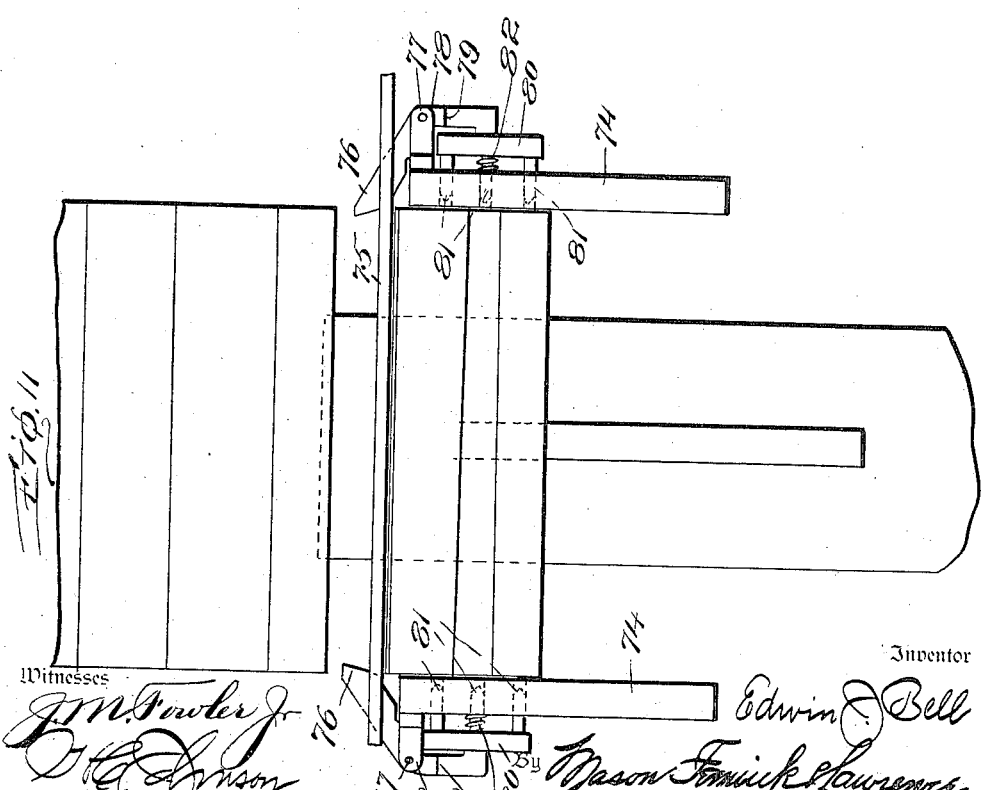

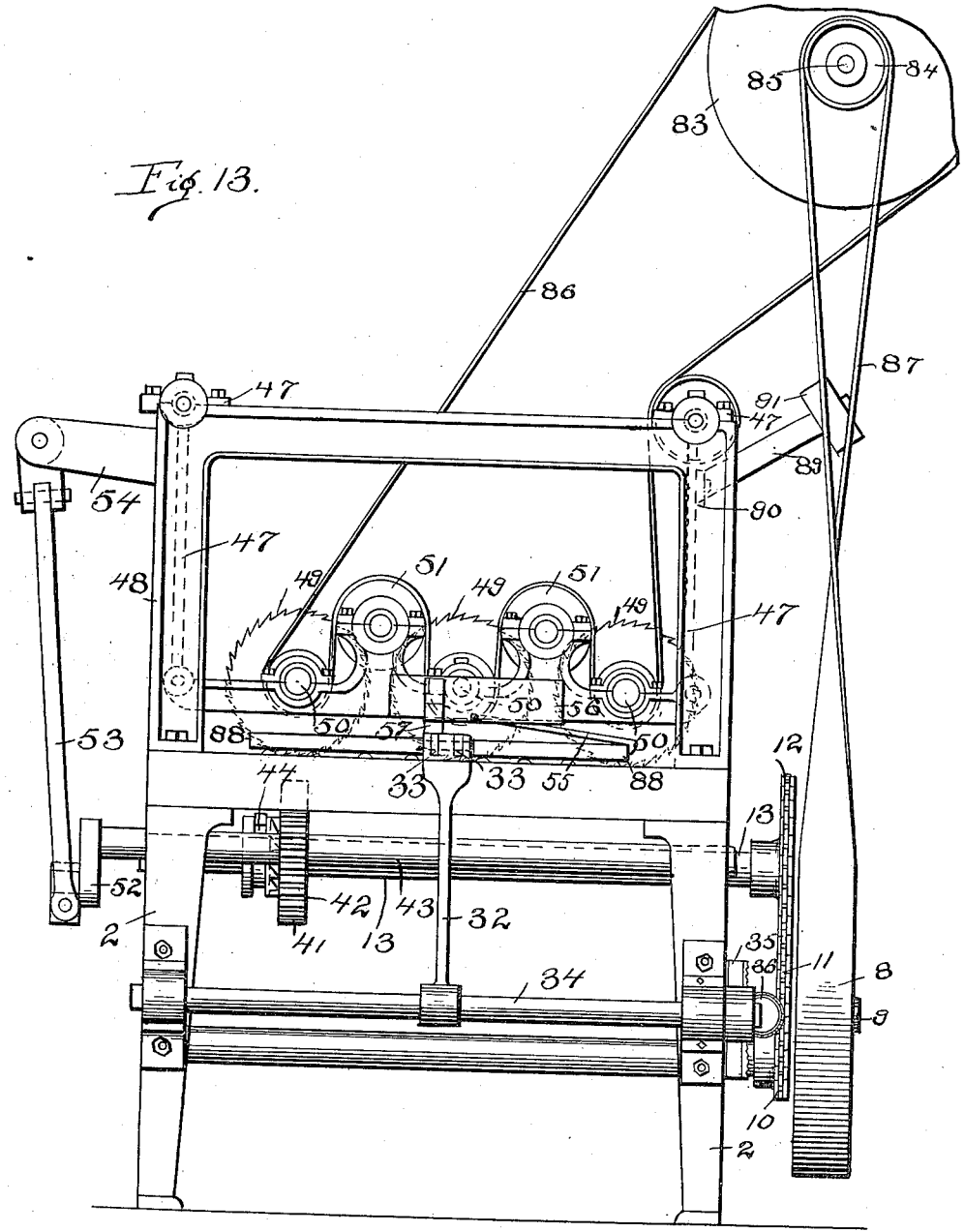

UNITED STATES PATENT OFFICE.

EDWIN J. BELL, OF OSHKOSH, WISCONSIN.

MACHINE FOR BUILDING UP BOARDS.

1,090,903.

Specification of Letters Patent. Patented Mar. 24, 1914.

Application filed April 13, 1911. Serial No. 620,825.

*To all whom it may concern:*

Be it known that I, EDWIN J. BELL, citizen of the United States, residing at Oshkosh, in the county of Winnebago and State of Wisconsin, have invented certain new and useful Improvements in Machines for Building Up Boards, of which the following is a specification.

My invention relates to a machine for building up boards from pieces.

My invention further relates to an automatic cut-off when the boards are built.

My invention further relates to an automatic mechanism for removing the boards as soon as they are cut-off.

My invention further relates to a continuous method of building up boards from pieces, cutting them off when built and removing them, after the cut-off.

My invention further relates to a swinging saw frame carrying a series of saws in alinement with each other.

My invention further relates to automatic safety appliances to support the contents of the hopper at the interval of the cut.

In the accompanying drawing Figure 1 represents a plan view of my invention and Fig. 2, a side view of the same. Fig. 3 represents a side view and Fig. 4 a top view of the pusher. Fig. 5 represents a side view and Fig. 5ª an end view of the rod upon which the pusher head is mounted. Fig. 6 is an end view. Fig. 7 is a side view and Fig. 8 a plan view of the supporting table upon which the pusher slides. Fig. 9 is a plan view and Fig. 10 a side view of the mechanism for supporting the contents of the hopper, on each side of the table opening. Fig. 11 is a plan view of a portion of the mechanism connected with the hopper. Fig. 12 is a view of the same mechanism in elevation. Fig. 13 is an end elevation of the machine.

2, 2, 2, 2, represent the supporting legs and 3, 3, the rails of the supporting frame.

4 represents the table and 5 represents the opening in the table.

6 represents the hopper.

7 represents the pieces of boards in the hopper resting on the table, across the opening. These pieces are preferably matched before being placed in the hopper.

The power is applied to the pulley 8, which revolves the shaft 9. The sprocket-wheel 10 is keyed to the shaft 9 and carries the sprocket chain 11, engaging the sprocket wheel 12, keyed to the shaft 13. The shaft 13 also carries the smaller sprocket wheels 14, 14, which operates the sprocket chains 15, 15, under the sides of the table opening, over the sprocket wheels, 16, 16, mounted on the shaft 17. Arranged upon each of the sprocket chains 15, 15, are the lugs 18, 18, two or more of which may be provided. The rod 19 is attached to the faces of the lugs 18, 18, and extends across and under the table opening 5. The pusher-head 20 is mounted revolubly, the rod extending through the opening 21. The pusher-head 20 carries the pivotal bar 22 arranged upon the pivot 23. The bar 22 is intended to revolve only slightly upon the pivot 23 and the scope of its revolution is limited by the tension of the strap springs 24, 24. The purpose of the bar 22 is to engage the lower piece in the hopper and the springs operate to allow a uniformity of pressure of the bar 22 if in engagement with a wedge-shaped piece.

The front end of the hopper is vertically adjustable sufficient to permit one piece at a time to be pushed from beneath the other pieces. Several pusher-heads may be carried by the operation of the sprocket chains 15, 15. Each pusher-head 20 carries the swivel bar 22 and, as the sprocket wheels revolve, pushes the bottom piece forward through the bottom opening of the hopper, the pusher-head operating through the opening 5. The pusher-head also operates to push the matched pieces together.

25 represents a base to the pusher-head 20 and is adapted to rise upon the pusher-head supporting-member 26, which will be termed a table. The table 26 operates to support the pusher-head in an upright position while engaging the pieces.

27 represents the base of the table 26 and is adapted to slide transversely in the ways 28, 28.

The forward movement of one of the pusher-heads pushes the lower piece from the hopper against the piece ahead between the rollers 29 and the opposite idler rollers 30, which operate as a retard and force the joints together. In the operation of the machine the pusher-head continues to advance the board on the table until the base of the pusher-head passes over the end of the supporting table 26 when the pusher-head having no upright support, drops backward turning upon the rod 19 and is permitted to pass beneath the piece. Each following pusher-head 20 repeats the operation and serves to build up a continuous board. In the operation of the machine, the board is continuously advanced on the table until the front end of the board impinges against the trigger 31. The trigger 31 operates automatically to move the table 26 transversely from beneath the pusher-head. When the trigger is forced forward by the advance of the board, the lever arm 32, pivoted at 33, keyed to the shaft 34, rocks the segmental gear 35 which engages the bevel gear 36 mounted upon the shaft 37 which is journaled in suitable supports at one side of the table. Shafts 34 and 37 do not revolve but only rock slightly in their bearings. The shaft 37 carries the upright lever arm 38 keyed thereto at 39 and connecting by rod 40 with the table 26. The rocking of the shaft 37 operates to slide the table 26 transversely in the ways 28, 28 from beneath the pusher-head 20, and permits the pusher-head to drop out of engagement with the pieces, when the board has been advanced to the desired length. The trigger operates to stop the advance at the required length of the board and may be adjusted to any desired length. An idler gear 41 is mounted loosely upon the shaft 13 and meshes with the gear 42 keyed to shaft 43. The side of the gear wheel 41 is provided with a clutch engagement adapted to engage the sliding clutch 44, which is mounted on shaft 13. The sliding of the table 26 operates the rod 45 connected therewith which carries the arm 46 operating to throw the clutch 44 in and out of engagement. When the table 26 is operated transversely from beneath the pusher-head 20 the clutch 44 is moved into engagement with the gear 41 causing the gears 41 and 42 to revolve. The revolution of said gears starts the revolution of the shaft 43. The swinging saw frame 47 supported by the standards 48, 48, carries the saws 49, 49, 49, mounted upon suitable arbors 50, 50, 50, with the take up idlers 51, 51. The saws are revolving continuously and are thrown into contact with the board by the operation of the shaft which carries the crank 52. The crank 52 is connected by means of the connecting rod 53 and the offset arm 54 to the swinging saw frame. As the shaft 43 is revolved by the clutch engagement the swinging saw frame is swung downwardly into engagement with the board until the board is sawed off. The saws are mounted in alinement with each other and the travel of the swinging frame is such that each of the saws cuts its portion of the board and is swung downward sufficiently so that each saw operates to cut its portion of the board, and the aggregate of the cuts completes the sawing of the board. The object of providing a series of saws in alinement is to shorten the time of the cut as compared with a single saw. The travel of each saw in a series is lessened and the arc of the swinging frame is shortened.

55 represents a "puller" the function of which is to pull the sawed off piece from the table. The puller consists of a skate-shaped hook loosely hung from the portion of the saw frame upon which the arbors are mounted, and, while the board is being built upon the table, rides on the board. As the saw frame is swung downward and forward to make the cut, the puller is carried transversely across the board and is positioned so that when the sawing operation is completed the hook drops over the edge of the board. When the saw frame is returned, the puller carried thereby operates to pull the sawed board from the table. The saw frame moves rapidly and imparts sufficient momentum to the board to effect the operation stated, notwithstanding the fact that the device 55 does not move across the full width of the table.

The plate 56 is rigidly attached to the side of the saw frame and, when the frame is swung, impinges against the beveled face of the relief trigger 57, which is pivoted to the arm, 32 at 33. The arm 32 carries both the triggers 31 and 57. As the saw frame is swung downward and forward for the cut, the plate 56 moves the triggers 57 and 31 and operates to remove the tension of the trigger 31 from the edge of the board, affording relief from pinching the saw and freeing the sawed off board so that the operation of the puller can slide the board easily from the table. The trigger operation moves the arm 32 which serves to rock the shafts 34 and 37 and carry the table 26 a short distance. The continued engagement of the plate 56 with the trigger 57, while the saw frame is swinging, affords a safety against any possibility of the pusher-head advancing the board while the saw is in the cut and a positive holding of the table 26 free from the pusher-heads. After the completion of the cut the saw frame is returned sufficiently to release the plate 56 from engagement with the trigger 57 and the weight 58' mounted on the arm 59, keyed to the end of the shaft 37, operates to return the table 26 and the triggers 31 and 57 to their normal positions and the table 26 is positioned to again support the pusher-heads in the advancement of the board.

The pin 58 passes through an opening in the table 26 and may be locked by thread or otherwise to the table 26 at 60, 60. The counter balance table 61 is permitted to rock upon the pin 58 and is provided with the arm 62 integral therewith which is of sufficient weight to counter-balance the weight of the pusher-head. The top of the table 61 is normally in the same plane with the table 26. The object of the table 61 is to support the pusher-heads in an upright position and provide a safety support while the table 26 is retained at one side out of action during the sawing operation, so that the table when released by the triggers may slide transversely to its normal position. The table 61 as mounted is yielding, the object being to support the pusher-head in an upright position without pushing power. Table 61 is intended to counteract the tendency of the pusher head to hang on its shaft when the sliding table is at one side, so that in the event the cut is finished while the pusher head is passing the sliding table, there is nothing to prevent the latter from moving back under the pusher head. In view of the yielding action of table 61, if the pusher head reaches a board in the hopper, while riding on said table 61, the board will not advance, but 61 would be pressed down and would allow the pusher head to pass under the board. If the pusher head should pass the sliding table at the time the cut is finished, the table could not return to its normal position until the pusher head had passed, in the absence of some provision such as that above specified.

It often occurs that the lower piece may be only partially fed from the hopper at the stopping of the feed for the sawing process, then the other pieces on top would be liable to topple backward. To avoid this I provide an automatic support for the pieces contained in the hopper. Fig. 9 represents a plan view showing only one of the supports and Fig. 10 is a side view of the same. Supports are provided on each side of the table opening 5. The ways 63, 63, are provided upon the table 4 at each side of the opening 5 and located at the rear of the hopper. The traveler 64 slides in the ways 63, 63, and carries the plate 65 attached thereto and having a projecting end sufficiently forward to be carried beneath the contents of the hopper in the operation of the machine. The traveler 64 is carried toward the hopper by means of engagement of the lug 66 with the pin 67, on each side. The lug 66 extends sufficiently beyond the travel of the pivotal bar 22 to engage the pin 67. The bar 22 pivoted at 23 is carried by the pusher-head. It will be understood that the forward movement of the pusher-heads carries the plates 65 on each side of the table-opening beneath the contents of the hopper to prevent toppling of the contents. When the pusher-head revolves rearward at the end of the stroke, the traveler 64 is released and is returned by the action of the weight 68. The rack 69 is located upon the table 4 on each side of the opening 5 outside of the way 63. 70, 70', represent openings in the table 4 at each end of the rack. The pawl 71 revolves on the stud 72 mounted in the bearing 73 located upon or integral with the traveler 64. When the forward motion of the pusher-head carries the traveler, the pawl 71 rides the rack 69, and, in case the forward motion of the pusher-head continues until the piece has cleared the hopper the pawl will automatically drop through the opening 70 and, as the traveler is released by the pusher-head and returned by the weight 68, the pawl will ride backward free upon the rack until it drops into the rear opening 70'. If the traveler should be released by the pusher-head before the piece has cleared the hopper, the pawl would be in engagement with the rack and would prevent the action of the weight from returning the traveler and the plate 65 would remain to support the contents of the hopper, until a following pusher-head would carry the piece from the hopper. The plate 65 has an inclined face to reduce friction against the contents of the hopper upon its return. This method of supporting the boards in the hopper is adapted to pieces of unequal length. In case the pieces are of equal length when fed to the hopper, I provide a simpler means for adjusting the hopper. Fig. 11 represents a plan view and Fig. 12 a side view of this feature of my invention.

The hopper 6 comprises in its construction two side pieces 74, 74, laterally adjustable upon the table and a front gate 75. The side pieces of the hopper are carried by angular brackets 100 which are connected by set screws 101 with shaft 102 extending transversely of the machine, and gate 75 is also adjustably connected with said shaft by short arms 103.

76, 76, represent bell-crank levers on each side pivoted at 77, 77, to the supports 78, 78, attached to sides 74, 74. The levers 76, 76, are offset at 79 to engage the plates 80, 80, and force the pins 81, 81, 81, 81, through openings in the sides 74, 74, into engagement with the ends of the piece in the hopper above the moving piece below, to sustain the contents of the hopper. In the operation of the machine the bottom piece engages the beveled end of the trip-levers 76, 76, and causes them to rock upon the pivots 77, 77, and force the pins 81, 81, 81, 81, into the ends of the piece in the hopper above the moving piece, sufficient to sustain the contents of the hopper. When the forward movement continues until the lower piece is carried beyond the levers 76, 76, they are automatically released and the pressure-springs 82, 82, act to restore the mechanism to its normal condition and the pins are withdrawn from the piece, permitting it to drop to the table.

In the operation of the machine the pieces are first placed in the hopper, having been previously matched and preferably glued, and usually the tongued edge forward. The advancement of the pusher heads continues to carry the lower pieces from the hopper upon the table under the pressure pieces and between the retarding rolls, until the front piece engages the trigger 31 acting to force the trigger. The action of the trigger operates to rock the connecting shafts and move the supporting table from beneath the pusher-head to relieve it. The feed is then stopped. The reciprocation of the table throws into engagement the clutch which swings the saw frame to make the cut. The swing of the saw frame throws the plate 56 into engagement with the bevel face of the trigger 57 and forces both triggers a short distance. The operation of the trigger 57 rocks the shafts slightly sufficient to reciprocate the supporting table to a degree for safety as described. After the saw cut and removal by the puller the operation is automatically restored as described.

It will be understood that the removal of the pusher-head-support may be accomplished otherwise than by the shafts and gear shown, I regard as one of the esential features of my invention the automatic withdrawal of the support from the pusher-head at the proper time.

The saws are in continuous motion and the pusher-heads are in continuous motion. My invention provides an automatic mechanism for throwing both mechanisms in and out of action at the proper time.

It will be observed that the front face of the hopper is inclined outwardly. This is of advantage in supplying pieces of different widths to the hopper and serves to balance the gravity support of the contents of the hopper.

The cut-off saws are driven by a separate moving power operating by belt from the same shaft that operates the pulley 8.

Fig. 13 represents an end view illustrating the driving means and sawing mechanism. In this view the saws are shown at a position partially through the cut. 83 represents the driving pulley for the saws and 84 represents the driving pulley for the machine, both mounted on shaft 85 which is suitably suspended in bearings from above. 86 represents the saw-driving belt and 87 represents the machine-driving belt. 88 represents the board. The arm 89 is bolted to the saw frame at 90 and carries the weight 91 which operates to retain the saw frame at the initial position out of engagement with the board after the swing. After the cut, the trigger 57 is released and positioned beneath the plate 56, and provides against any idle swinging of the saw frame or engagement of the saws with the advancing board. It will be understood that, in the operation of the machine, the trigger 57 is forced a short distance before the saw frame is swung for the cut. Then the plate 56 is permitted to engage the bevel face of the trigger 57.

Having thus described my invention what I claim is—

1. In a machine of the class described, a table, a saw frame mounted therein and arranged to swing transversely of the table, saws carried by the frame and arranged to engage a board during the swinging movement, board feeding means, a trigger adapted to be engaged by a board and controlling the feeding means, a counter-balanced safety trigger engaged by the saw frame during the full sawing operation and connected with the feeding means, preventing the feeding of a board while another board is being cut.

2. In a machine of the class described, a table, a saw frame mounted therein and arranged to swing transversely of the table, saws carried by the frame and arranged to engage a board during the swinging movement, board-feeding means including a plurality of members one of which is pivoted and counter-balanced, a trigger adapted to be engaged by a board and controlling the feeding means, a counter-balanced safety trigger engaged by the saw frame during the full sawing operation, and connected with the feeding means, preventing the feeding of a board while another board is being cut.

3. In a machine of the class described, a table, a plurality of saws mounted thereon, a hopper mounted on the table, a member arranged to reciprocate transversely of the table, a pusher head, a traveling device carrying the pusher head, supporting means for said pusher head mounted on the reciprocating member, and comprising a plurality of members in substantially parallel relation, one of which is pivotally mounted, the said pusher head feeding the boards from the hopper.

4. In a machine of the class described, a hopper, a pusher head supporting member arranged to reciprocate beneath the said hopper, a traveling member, a pusher head mounted beneath the hopper, and carried by the traveling member, the supporting member holding said pusher head in operative position for a given interval, and a second supporting member pivotally mounted adjacent to that first mentioned and arranged to support the pusher head for an interval preceding the interval first mentioned.

5. In a machine of the class described, a hopper, a member mounted beneath said hopper, and arranged to reciprocate in a transverse direction with reference to the path of feed from said hopper, a continuously traveling member, a shaft connected therewith, and arranged to move across the reciprocating member, a pusher head mounted on the shaft, a member movable with the reciprocating member and supporting said pusher head for a given interval, a second pusher head supporting member pivotally mounted adjacent to that first mentioned and substantially parallel therewith, the upper surface being flush with the surface of the supporting member first mentioned, said second supporting member reaching the pusher head before the first has passed the path of movement thereof, and means for counter-balancing the pusher head when retained in position by the second supporting member.

6. In a machine of the class described, a hopper, a table on which the hopper is mounted, a shaft and means for causing the shaft to travel beneath the hopper, a pusher head on siad shaft and rotatably mounted, said pusher head comprising a board engaging device, and a base arranged to slide on a suitable support, a main supporting member movable transversely of the table and designed to support the pusher head during a given interval, a base for the supporting member, ways for said base, a pivotally mounted supporting member adjacent to the main supporting member and having a surface substantially flush therewith, said pivotally mounted member coöperating with the main supporting member in the support of the pusher head and controlling the interval of such support, and means for counter-balancing the pivoted member and for yieldingly supporting the pusher head when the latter is carried by the pivoted member.

7. In a machine of the class described, a hopper, a pusher head for feeding boards from said hopper, traveling means on which the pusher head is rotatably mounted, a rigid support for the pusher head, and a yielding support for the latter, said yielding support being brought into operation preceding the operation of the rigid supporting member.

8. In a machine of the class described, a hopper, means for feeding boards therefrom, said means comprising a traveling device and a board engaging member, and means for supporting boards within the hopper, comprising devices spread apart horizontally by sliding contact with the extreme forward ends of the lowermost board, and means operated by said devices, for engaging the board above the first mentioned board.

9. In a device of the class described, a hopper, means for feeding boards therefrom and means for supporting boards within the hopper, said means comprising devices spread apart horizontally by sliding contact with the extreme forward ends of the lowermost board, devices extending through the sides of the hopper and engaging the board next above and means whereby said devices are operated by the devices engaged by the lower board.

10. In a device of the class described, a hopper, means for feeding boards therefrom and means for supporting boards within the hopper, said means including horizontal pivotally mounted levers spread apart by sliding contact with the extreme forward ends of the boards and devices extending through the walls of the hopper and engaging one of the boards when the levers are engaged by the ends of the lower board.

11. In a device of the class described, a hopper, means for feeding boards therefrom and means for supporting boards within the hopper, said supporting means comprising bell-crank levers mounted horizontally at the lower sides of the hopper and operated by sliding contact with the extreme ends of a board moving in the same horizontal plane, pins projecting through the walls of the hopper and arranged to engage one of the boards, devices engaging the pins and operated by the levers when said levers are engaged by the forward ends of a board below the board first mentioned.

In testimony wherof I affix my signature, in presence of two witnesses.

EDWIN J. BELL.

Witnesses:
N. F. KIMBALL,
A. R. WATERHOUSE.

Copies of this patent may be obtained for five cents each, by addressing the "Commissioner of Patents, Washington, D. C."